United States Patent [19]
Tehan

[11] Patent Number: 5,201,598
[45] Date of Patent: Apr. 13, 1993

[54] ATTACHMENT OF CORD TO TUBE END USING LOCKING SLEEVE TO PERMIT EASY CORD REPLACEMENT

[76] Inventor: Frank V. Tehan, 1801 Eastshore Hwy., Berkeley, Calif. 94710

[21] Appl. No.: 738,320

[22] Filed: Jul. 31, 1991

[51] Int. Cl.⁵ .................................................. B25G 3/14
[52] U.S. Cl. .................................... 403/372; 403/365; 403/251; 403/283; 135/909
[58] Field of Search ............... 403/365, 372, 105, 109, 403/251, 283, 361, 292, 355, 356; 135/114, 909, 106; 24/115 M, 136 L, 136 R

[56] References Cited

U.S. PATENT DOCUMENTS

| | | | |
|---|---|---|---|
| 2,529,219 | 11/1950 | Kost | 403/361 |
| 3,033,600 | 5/1962 | Drysdale | 24/136 R |
| 3,223,098 | 12/1965 | Dole | 135/105 X |
| 3,448,748 | 6/1969 | Walrave | 135/1 |
| 3,669,133 | 6/1972 | Hyman | 135/45 |
| 3,947,141 | 3/1976 | Casset | 403/109 |

FOREIGN PATENT DOCUMENTS

| | | | |
|---|---|---|---|
| 972971 | of 1951 | France | 135/114 |
| 323 | of 1902 | United Kingdom | 403/365 |

OTHER PUBLICATIONS

REI Field-Repairable Tent-pole Tip, 1 sheet.

*Primary Examiner*—Andrew V. Kundrat
*Assistant Examiner*—Harry C. Kim

[57] ABSTRACT

A locking sleeve (14) for holding the tensioned, internal elastic cord (22) of a compactable, collapsible tubular assembly (12-10) comprises a resilient member (14), in the shape of a slit tube. It is held in position within the tubular insert of the compactable, tubular assemblies by external barbs (16). The elastic cord is in turn held in position within the locking sleeve by an internal tongue (20) and prongs (18).

10 Claims, 3 Drawing Sheets

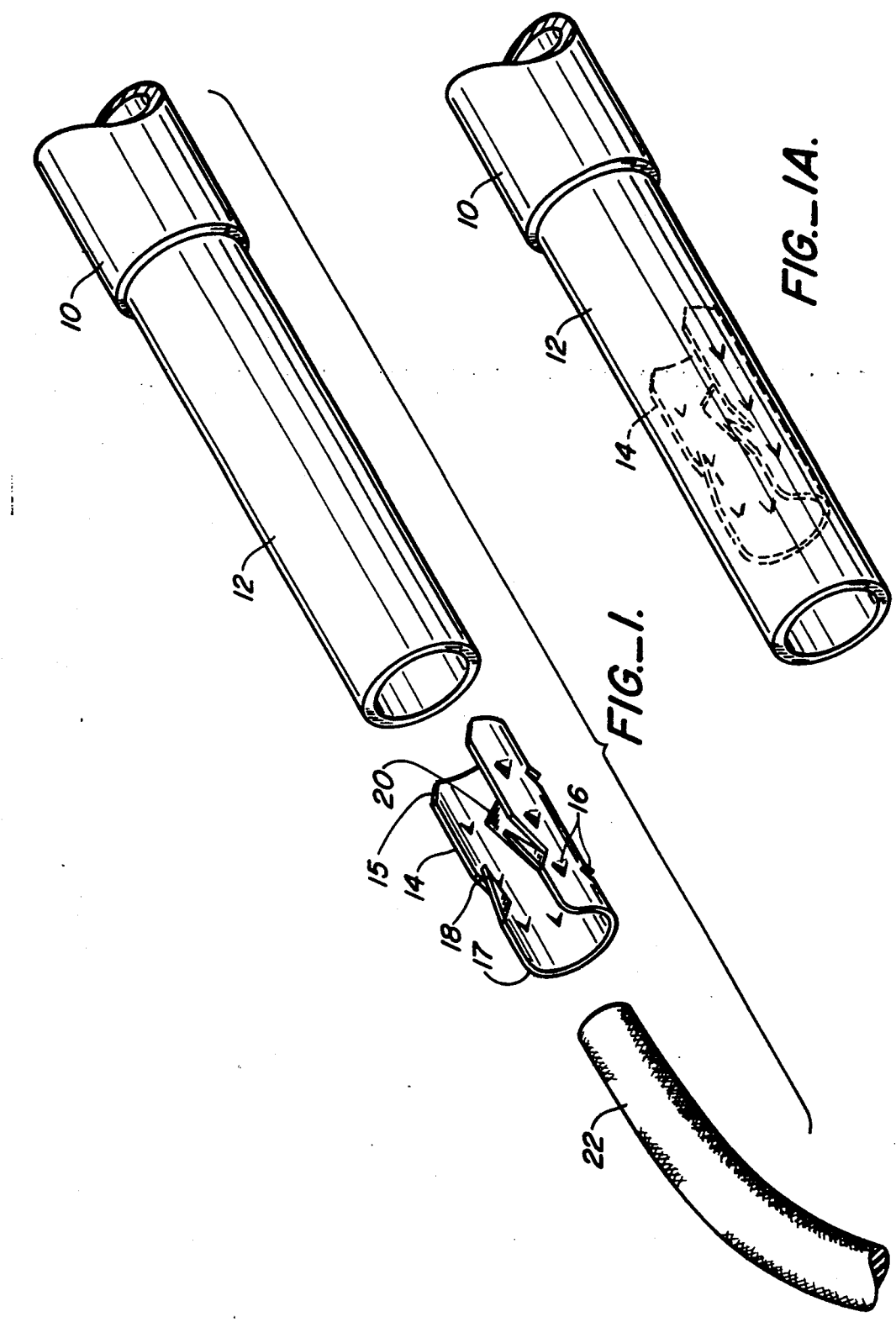

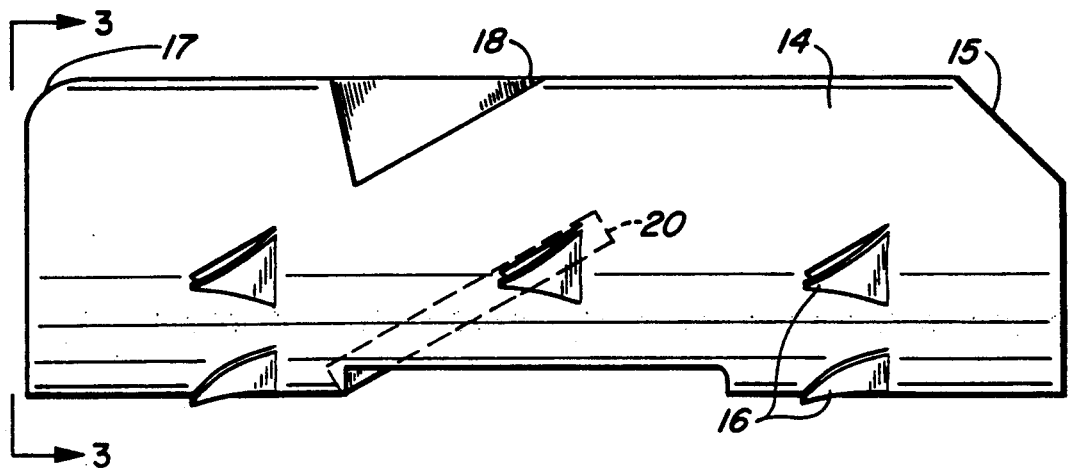
FIG._2.
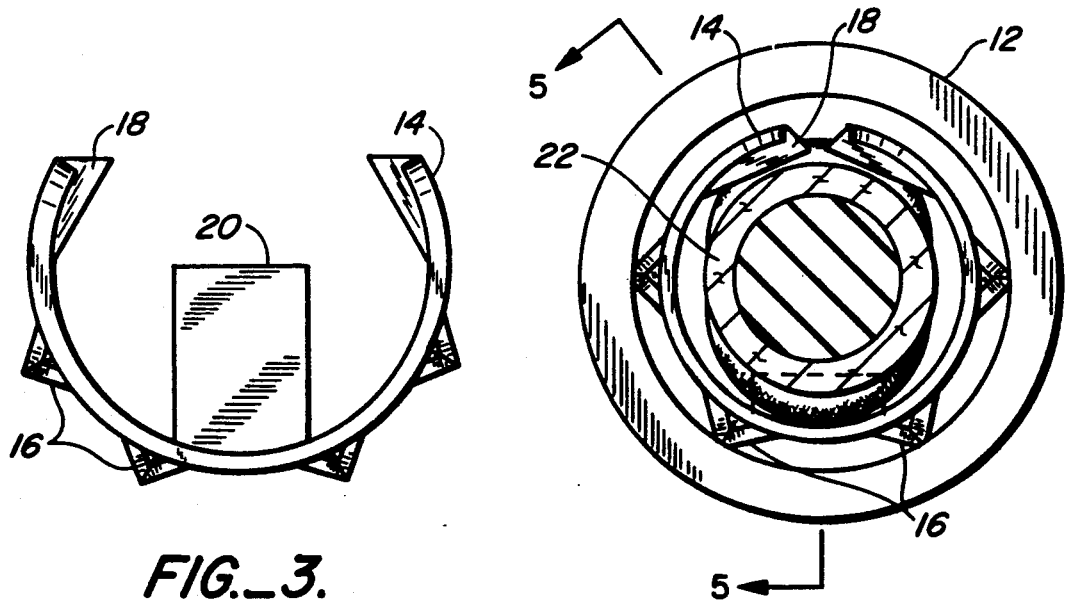
FIG._3.
FIG._4.

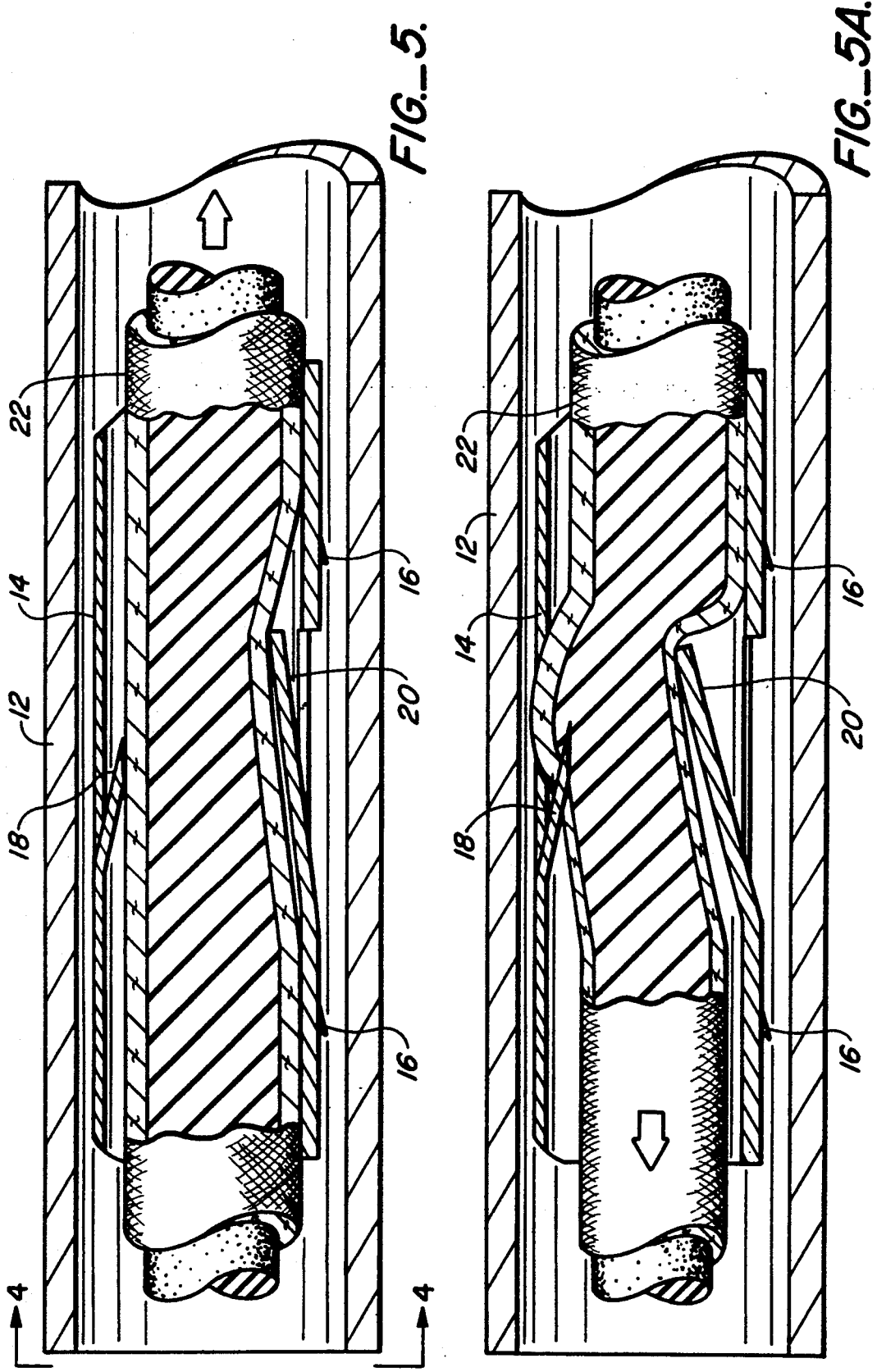

ATTACHMENT OF CORD TO TUBE END USING LOCKING SLEEVE TO PERMIT EASY CORD REPLACEMENT

BACKGROUND

1. Field of Invention

This invention relates to compactable tubular assemblies, such as tent poles, specifically to a locking for holding an internal elastic cord in such poles.

2. Prior Art

Most contemporary tent poles are composed of several tubular sections which are joined with tubular inserts. An insert is affixed to one end of a section so that it extends beyond the end of the section to form a male end. The extending male end is arranged to slip int an open, female end of an adjacent section. All the pole's sections are connected by an internal elastic cord under tension, which draws the sections together, or allows them to be unjointed and folded. The elastic cord is usually held in position within the pole by way of knotted cord ends and washers seated behind the inserts of the end sections of the pole.

The elastic cord must be threaded through the entire length of the pole in order to make the cord accessible for installation of washers (which lock the cord's end sin the sections) and knotting. However, the elastic cord, when tensioned and held in position, extends only from the end section insert at one end of the pole, through the pole's inner sections, to the end section insert at the opposite end of the pole. It does not extend the entire length of the pole. The ends of the tent pole usually have end tips which fit into grommets in webbing tabs sewn to the tent, although some tent designs require that the ends of the tent pole be open, without end tips.

The above tent pole assembly technique produces a tent pole which functions well in use, but presents difficulties when the pole must be disassembled for repair due to damage, or when the pole's elastic cord becomes slack and must be tensioned again. The elastic cord must be cut, preferably next to the insert of one of the end sections of the tent pole. Next, the end tip, if it is of the pres-fit type, must be removed from this now loose end section so that the knotted cord end and washer can be removed from within this pole section. Removing a press-fit end tip from its pole section usually damages the tip so that it almost always must be replaced with a new tip. If the end tip is affixed to its section with glue or by staking, both the section and the tip must be replaced with a new section and tip. Next, the damaged sections of the tent pole must be replaced with new ones and the pole reassembled. Finally, the new end tip must be affixed to its end section. This same procedure must be followed if the tent pole's elastic cord needs additional tension. Some of these steps require special tools and experience to be done effectively, so tent pole repair or elastic cord tensioning usually can not be done by the tent owner, or even by average retail store personnel.

Elastic cord holding devices, such as wire spring devices, have been made and used in the past, but these devices will not be discussed because their main purpose was not to facilitate the manufacture, repair, or elastic cord tensioning, but rather just to hold the elastic cord in position.

One end tip has been developed specifically for tent poles. Its purpose and advantages over existing techniques are easier tent pole manufacture, repair, and elastic cord tensioning. This end tip was designed to hold the tensioned elastic cord in position at the ends of the pole, and the tension of the elastic cord was supposed to hold the end tip on to the pole ends. However any advantages which this end tip design might offer, in terms of convenience of manufacture, repair, or elastic cord tensioning, are far outweighed by its disadvantages, which are:

(a) The end tip can be pulled completely out of the end of the pole during the removal of the pole from the tent. This is because only the tension of the elastic cord is holding the end tip on to the pole end. End tips tend to bind in their mating grommet because of their angle of engagement. This binding force can exceed the pulling force of the elastic cord, causing the end tip to be pulled out of the pole end, causing the tip and the cord to separate. The entire pole will come apart as a result of this failure.

(b) Tent poles using this type of end tip are limited in their use because they cannot be used with tents which require poles with open ends.

(c) The elastic cord must extend the entire length of the tent pole, from end to end tip, unlike current assembly technology where the cord extends only through the inner sections of the pole. The additional cord adds weight and cost to the pole.

OBJECTS AND ADVANTAGES

Accordingly, several objects and advantages of this invention are:
(a) to facilitate the manufacture, repair, and elastic cord tensioning of compactable tubular assemblies;
(b) to hold the elastic cord of a tent pole securely in position within the tubular inserts of a compactable tubular assembly;
(c) to allow the elastic cord to be threaded into the tubular insert, while still preventing the cord from being pulled back out;
(d) to provide a technique for the repair and elastic cord tensioning of compactable tubular assemblies, such as tent poles, which will be easy and simple enough for the item owner or for average retail store personnel to repair; and
(e) to provide advantages over existing technology in order to increase the efficiency of compactable tubular assembly manufacture.

Further objects and advantages will become apparent form a consideration of the ensuring description and drawings.

DESCRIPTION OF DRAWINGS

FIG. 1 is an exploded view of the major components of a compactable tubular assembly in accordance with the invention. It shows an elastic cord, an elastic cord locking sleeve, and a tubular section with a tubular insert affixed.

FIG. 1A is the same view as FIG. 1, except that the locking sleeve is in position within the tubular insert.

FIG. 2 is an enlarged side view of the locking sleeve.

FIG. 3 is an enlarged front view of the locking sleeve.

FIG. 4 is an enlarged front view of the elastic cord and locking sleeve in place within the tubular insert.

FIG. 5 is an enlarged fractional cross section of the elastic cord and the locking sleeve within the tubular insert.

FIG. 5A is the same view as FIG. 5, except that the elastic cord is under tension, as designated by the arrow.

Drawing Reference Numerals
10 tubular section
12 tubular insert
14 elastic cord locking sleeve
15 chamfered rear end corners
16 barbs
17 rounded front end corners
18 prongs
20 tongue
22 elastic cord

SUMMARY

In accordance with the invention, a tensioned, internal elastic cord is held within one section of a compactable, collapsible tubular assembly, e.g., a tent pole, by means of a locking sleeve. The sleeve comprises a resilient member in the shape of a slit tube. It is held in position within the section of the assembly by external barbs. The elastic cord is in turn held in position within the locking sleeve by an internal tongue and prongs. If the cord breaks or tears, it an be easily replaced by cutting it off near the locking sleeve and pushing it back through the sleeve and into the section of the assembly to free the locking sleeve. Then a new section of cord can easily be inserted into the locking sleeve where its internal tongue and barbs will lock the cord in place.

Description

A typical embodiment of an elastic cord locking sleeve of the present invention is shown in FIG. 1 (perspective exploded view), FIG. 1A (perspective assembled view), FIG. 2 (side view), and in FIG. 3 (rear end view). The sleeve and its adjacent parts comprise an elastic cord, a tubular insert, and a tubular section, which will be described. The terms front and rear are relative to the front and rear ends of the tubular insert into which the locking sleeve is positioned, as shown in FIGS. 1, 1A, 4, 5, and 5A.

As shown in FIG. 1, a tubular section of a tent pole, cane, or other elongated structural support member is to be joined to another similar tubular section. The two sections are joined by means of a tubular insert 12 which extends into and is attached to section 10 in a conventional manner, e.g., by a force (press) fit, gluing, or staking. To aid in drawing the parts together, an elastic cord 22 is attached to the interior of the assembly consisting of insert 12 and section 10 and extends into the interior of the adjacent tubular section to which assembly 10–12 is to be joined. In conventional fashion, cord 22 pulls and holds both tubular sections together, but allows them to be separated so that the tent pole, cane, etc., can be collapsed.

While not to be construed as limiting, to get a feel for the sized of typical parts, in one embodiment where the sections were attached to form thin tent poles, insert 12 has an outer diameter of about 5 to 6.3 mm, section 10 and its mating section (not shown) has an outer diameter of about 8.5 to 9.6 mm, insert 12 extends about 2 to 3 cm into section 10, and protrudes from section 10 by about 4 to 6 cm. Insert 12 and section 10 preferably are made form aluminum about 0.6 to 0.8 mm thick. cord 22 is preferably made of braided nylon or cotton with rubber internal strands and is about 3.5 to 4 mm thick. These dimensions and materials can be made larger or smaller to suit the application, which can range from arrows to very large poles or canes.

In accordance with the invention, cord 22 is held in insert 12 by means of a locking sleeve 14 which is made in the shape of a slit tube (FIG. 1). Its exterior surface has barbs 16 which face outward and towards the front end of the sleeve. The barbs are in the shape of an equilateral triangle, but other shapes can be employed. The outside diameter of sleeve 14 is larger than the internal diameter of tubular insert 12 into which it is inserted.

The locking sleeve thus comprises a resilient member having two opposing major surfaces, one of which is an outer surface and is convex when seen in a direction normal thereto, and the other of which is an inner surface and is concave when seen from a direction normal thereto. The resilient member is concentric to a longitudinal axis thereof. The sleeve has sleeve locking means protruding from the outer surface and extending in one direction relative to its longitudinal axis, and internal member locking means protruding form its inner surface in a direction opposite to said one direction relative to the longitudinal axis.

When the sleeve is squeezed and pressed into tubular insert 12, its resiliency forces barbs 16 into the interior wall of the insert (FIGS. 1A and 4). The shape and the angle of the barbs allow the sleeve to be pushed into insert 12, but prevent the sleeve form being pulled out of the insert since they dig into the wall of the insert. The sleeve has chamfered rear end corners 15 which facilitate insertion of the sleeve into the tubular insert. Also the sleeve has rounded front end corners 17 which reduce the likelihood of physical injury.

On the sleeve's interior, opposite the open slit and centrally located, is a flat, rectangular shaped tongue 20. Tongue 20 angles in and back toward the rear end of the sleeve. Nearly opposite the tongue, and located near the center on both edges of the open slit, are sharp prongs 18 which are angled in and back toward the rear end of the sleeve.

The preferred material for sleeve 14 is spring steel. It is about 16 to 19 mm long and about 0.2 mm thick. Its outer diameter is about 7 to 8 mm. In its unstressed state, about 70% of the circumference of the sleeve is solid as shown in FIG. 3; the rest of the circumference is a longitudinal gap which allows the sleeve to be compressed so that, when inserted into insert 12, its edges almost touch, as shown in FIG. 4.

Operation

In operation, sleeve 14 is inserted into insert 12 by simply squeezing it slightly and pushing it into insert 12 about 1 cm, as shown in FIG. 1A. Once so inserted, the sleeve will be firmly locked since its barbs 16 will engage the sleeve's inner wall and thereby prevent pullout.

The purpose and function of sleeve 14 is to hold the elastic cord in position within tubular insert 12. Because tongue 20 and prongs 18 of sleeve 14 are angled in and back toward its rear end, the elastic cord can be pushed or threaded past them without resistance and without engaging them (FIG. 5). However, once a pulling force is applied to cord bay tensioning it in the direction of the arrow in FIG. 5A, tongue 20, which is angled, engages the cord, acting as a jam stop. The tongue also forces the cord to be pierced and held by prongs 18, which are sharp. The tongue alone is capable of preventing the elastic cord from being withdrawn from the locking sleeve under normal cord tension. However, the combination of the tongue and the prongs make it almost impossible for the elastic cord to be removed from the sleeve, even when an extreme pulling force is exerted on the cord.

Thus the reader will see that sleeve 14 provides a simple, yet reliable and easy ways to attach cord to insert 12 and section 10.

If cord 22 breaks or tears and has to be replaced, the user simply cuts it as close to insert 12 as possible. Then, with the aid of a thin rod or the like, the user pushes the portion remaining in sleeve 14 back into the rear portion of insert 12 and section 10 so that it will be loose and free of sleeve 14. The loose piece of cord can be removed at the other end of section 10 (not shown) if it is open, or it can be left inside section 10 if the rear end of section 10 is closed. Then the above cord insertion process can be repeated again by pushing a new length of cord 22 into the insert 12 and then releasing it. As before, pushing additional cord into the insert and releasing it causes the tension of the cord to pull it back into the tongue and prongs, engaging them again.

The replacement process can be performed by lay personnel with ordinary tools and can be repeated as many times as desired.

Also, it the cord has too much slack once it is pushed into sleeve 14, an additional length can easily be pushed into the sleeve to reduce the slack. The portion of the cord previously engaged with the sleeve will be pushed back into section 10 by the new length.

The locking sleeve can be retrofitted into existing tent pole sections to enable them to be re-corded easily.

Conclusion, Ramifications, and Scope

As the reader will have seen, the following are the advantages of the elastic cord locking sleeve in tent pole manufacturing, assembly, disassembly, repair, and elastic cord tensioning:

(a) Adding tension to a tent pole's slack elastic cord is accomplished simply by advancing the cord into the insert until the desired cord tension is achieved. The tent pole does not have to be disassembled to accomplish this.

(b) When a tent pole with locking sleeves installed during manufacture becomes damaged and needs repair, the elastic cord has only to be cut near the insert of one of the end section, the damaged sections removed and replaced, and the cord threaded back into the end section's insert and locking sleeve where it will be held in position. The short cord piece which remains in the locking sleeve after the elastic cord is cut will be pushed out of the sleeve and down into the end section by the new end of the elastic cord. End tips no longer need be removed during disassembly.

(c) Although a tubular insert can be designed to incorporate an integral locking mechanism, it was decided to design the locking sleeve as a separate unit that can be retrofitted during repair to tent poles which were originally manufactured with the knot and washer assembly technique. The same repair procedure is followed as described in paragraph (b), except that after the elastic cord is cut, a locking sleeve is pressed into the insert of the end section of the pole. The remaining knot and washer will be pushed out of the way by the new end of the cord as it is being inserted into the locking sleeve.

(d) Elastic cord tensioning and tent pole repair are now simple and easy enough that the average retail store person or tent owner can do them. Special experience or tools are no longer necessary in order to do these jobs efficiently.

(e) Tent poles now can be manufactured with glued end tips instead of press-fit end tips. This is because it is no longer necessary that end tips be removed for pole repair or cord tensioning. Glued end tips are permanent and cannot work loose, as can sometimes happen with press-fit end tips.

(f) End tips now can be affixed to the end sections of tent poles prior to elastic cord assembly during manufacture. In the past, the end tips had to be affixed to the tent poles after elastic cord assembly, because the cord had to be threaded through the entire pole in order to install washers and to tie knots on the cord at each end of the tent pole. Affixing end tips, whether they be press-fit or glued, on fully assembled poles is one of the more difficult manufacturing procedures because tent poles are usually long and unwieldly.

(g) The manufacturing time of tent poles is reduced because washer installation and knotting of the elastic cord has been eliminated, and so has the necessity of threading the cord through the entire length of a tent pole in order to make it accessible for those procedures. The elastic cord now need only be threaded through the inner sections of a tent pole and into the locking sleeves within that pole's end section inserts in order to the force to be held in position.

Although the description above contains many specificities, these should not be construed as limiting the scope of the invention but as merely providing illustrations of some of the presently preferred embodiments of this invention. For example, the shape, location, and number of prongs and tongue can vary in other embodiments. Also, the materials used can be changed. The sleeve can be made of any material which has the appropriate resiliency to cause the locking sleeve to remain in position within the tubular insert when the elastic cord is tensioned. While tent poles have been used as an example, this was done because they are the most common form of compactable tubular assembly; the sleeve of the invention is equally applicable to collapsible canes, arrows, etc.

Thus the scope of the invention should be determined by the appended claims and their legal equivalents, rather than by the examples given.

I claim:

1. A section of tubing having a locking cord attached to one end of said section of tubing, comprising:
   a locking sleeve comprising a resilient member having two opposing major surfaces, one of which is an outer surface and is convex when seen in a direction normal thereto, the other of which is an inner surface and is concave when seen from a direction normal thereto, said locking sleeve having a longitudinal gap defined by opposed edges,
   said resilient member being concentric to a longitudinal axis thereof,
   said resilient member having sleeve locking means protruding from said outer surface of said resilient member and extending in one direction relative to said longitudinal axis, said sleeve locking means engaging an inner wall of said section of tubing so as to lock said sleeve within said section of tubing adjacent an end thereof,
   said resilient member having cord locking means protruding from said inner surface of said resilient member in a second direction opposite to said one direction relative to said longitudinal axis said cord locking means comprising a plurality of prongs on the edges defining said longitudinal gap and a tongue on said inner surface, said cord comprising an elongated length of cord having one end thereof inserted into said locking sleeve so that said cord locking means engages said cord and locks said cord within said sleeve, whereby said cord can be easily replaced from one side of said section of tubing if said cord frays, tears, or is broken by cutting said cord off adjacent to said sleeve so as to leave a section of said cord remaining in said sleeve, removing said section of cord remaining in said sleeve by pushing it back in said second direction so as to disengage it from said sleeve, and inserting an end of a new cord into said locking sleeve.

2. The section of tubing of claim 1 wherein said sleeve locking means comprises a plurality of barbs.

3. The section of tubing of claim 1 wherein said resilient member comprises a generally rectangular piece of sheet metal which is bent along around a single axis of curvature to form a cylindrical member having said longitudinal gap thereon.

4. The section of tubing of claim 3 wherein said sleeve locking means comprise a plurality of barbs.

5. The section of tubing of claim 1, further including an elongated length of tube having said section of tubing inserted into said length of tube and protruding from one end thereof.

6. A method of attaching a locking cord to one end of a section of tubing, comprising:

providing a locking sleeve comprising a resilient member having two opposing major surfaces, one of which is an outer surface and is convex when seen in a direction normal thereto, the other of which is an inner surface and is concave when seen from a direction normal thereto, said resilient member being concentric to a longitudinal axis thereof, said resilient member having sleeve locking means protruding from said outer surface of said resilient member and extending in one direction relative to said longitudinal axis, said locking sleeve having a longitudinal gap defined by opposed edges, inserting said sleeve locking means into said section of tubing so that said locking sleeve engages an inner wall of said section of tubing adjacent an end thereof and so that said locking sleeve will be attached to said section of tubing, said member having cord locking means protruding from said inner surface of said resilient member in a second direction opposite to said one direction relative to said longitudinal axis, said cord locking means comprising a plurality of prongs on the edges defining said longitudinal gap and a tongue on said inner surface, inserting one end of an elongated length of cord into said locking sleeve so that said cord locking means engages said cord and locks said cord within said locking sleeve, whereby said cord can be easily replaced from one side of said section of tubing if said cord frays, tears, or is broken by cutting said cord off adjacent to said sleeve so as to leave a section of said cord remaining in said sleeve bay pushing it back in said second direction so as to disengage it form said sleeve, and inserting an end of a new cord into said locking sleeve.

7. The method of claim 6 wherein said inserting said sleeve locking means comprises inserting sleeve locking means having a plurality of barbs.

8. The method of claim 6 wherein said providing a locking sleeve comprising a resilient member comprises providing a generally rectangular piece of sheet metal which is bent along around a single axis of curvature to form a cylindrical member having said longitudinal gap thereon.

9. The method of claim 8 wherein said inserting said sleeve locking means comprises inserting sleeve locking means comprising a plurality of barbs.

10. The method of claim 6, further including providing an elongated length of tube having said section of tubing inserted into said length of tube and protruding from one end thereof.

* * * * *